United States Patent [19]

Mercier

[11] 4,298,030

[45] Nov. 3, 1981

[54] ADJUSTABLE PULSE DAMPENER

[75] Inventor: Jacques H. Mercier, Paris, France

[73] Assignee: Normand Trust, New York, N.Y.

[21] Appl. No.: 135,332

[22] Filed: Mar. 31, 1980

Related U.S. Application Data

[63] Continuation-in-part of Ser. No. 66,817, May 15, 1979.

[51] Int. Cl.³ ............................................. F16L 55/00
[52] U.S. Cl. ........................................ 138/30; 138/39
[58] Field of Search ............................ 138/30, 26, 43; 137/207; 220/85 B

[56] References Cited

U.S. PATENT DOCUMENTS

| | | | |
|---|---|---|---|
| 3,782,418 | 1/1974 | Zahid | 138/26 |
| 3,857,413 | 12/1974 | Zahid | 138/30 |
| 3,868,972 | 3/1975 | Zirps | 138/30 |
| 4,069,844 | 1/1978 | Zahid | 138/30 |
| 4,134,429 | 1/1979 | Zahid | 138/30 |
| 4,178,965 | 12/1975 | Zahid | 138/30 |
| 4,248,269 | 2/1981 | Mercier | 138/30 |

*Primary Examiner*—Willis Little
*Attorney, Agent, or Firm*—Arthur B. Colvin

[57] ABSTRACT

The present invention relates to an apparatus for dampening pulses in a hydraulic system and is characterized by the provision of a hydraulic accumulator device having disposed in the hydraulic flow path a baffle member shiftable from the exterior of the dampener in a direction normal to the flow path and toward and away from the oil port of the accumulator whereby the device may be critically adjusted or tuned to deal effectively with pulses of a variety of frequencies and amplitudes.

7 Claims, 1 Drawing Figure

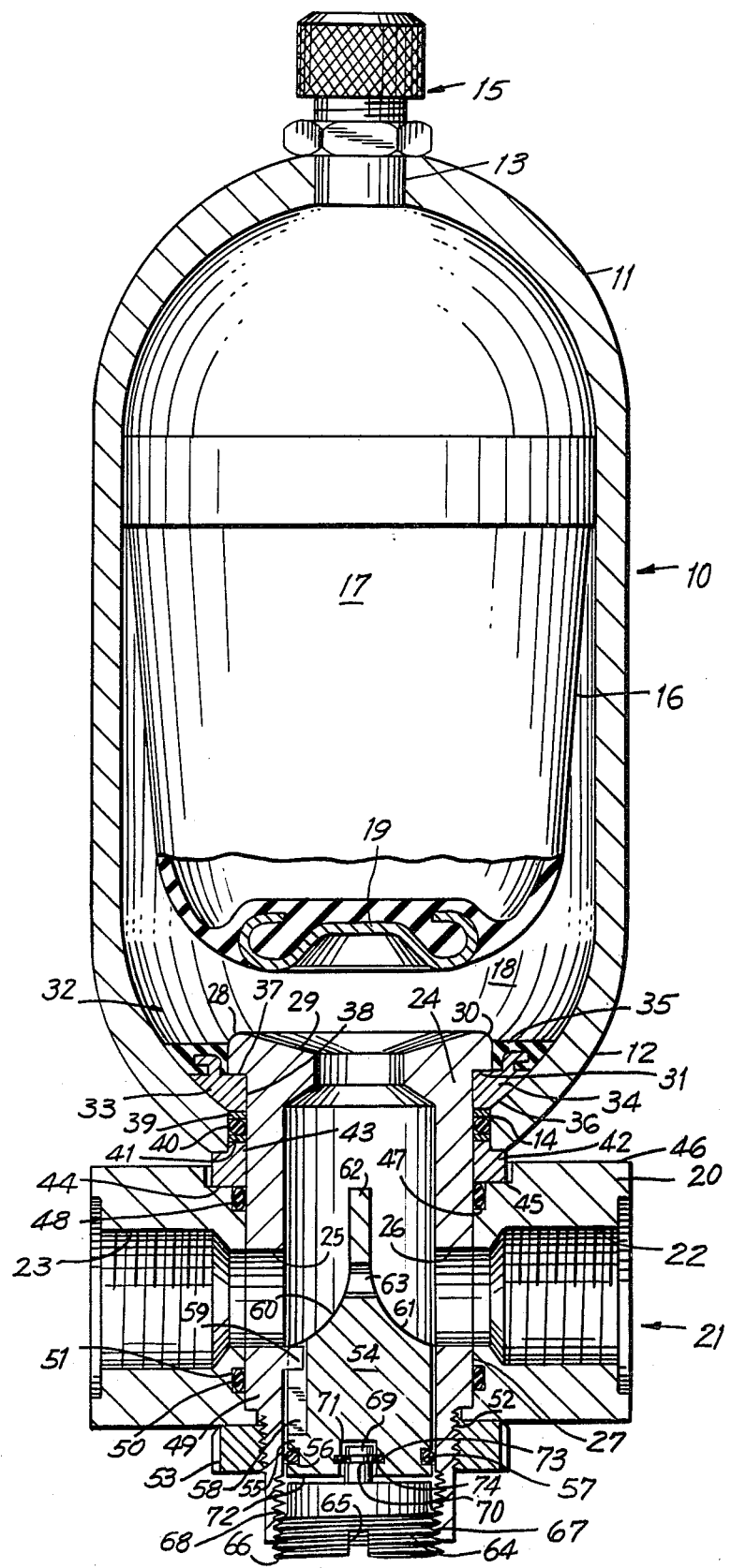

ADJUSTABLE PULSE DAMPENER

This application is a continuation in part of copending application Ser. No. 66,817, filed Aug. 15, 1979 and entitled ADJUSTABLE FLOW PULSE DAMPENER.

BACKGROUND OF THE INVENTION

1. Field of the Invention

The present invention is in the field of pressurized pulse dampener devices of the type frequently employed in hydraulic systems to minimize the transmission of pulses generated, for instance, in a hydraulic pump, to the hydraulic system downstream of the dampener.

2. The Prior Art

It is conventional in accordance with current practice to employ in a hydraulic system wherein pulses are created, such as by a multiple piston pump, a pulse dampener the function of which is to reduce the deleterious effects of pulses within the system. By way of example, pulse dampeners of the type described are illustrated in U.S. Pat. Nos. 3,782,418, 3,857,413 and 4,069,844. Such devices typically comprise a pressure vessel divided into two chambers by a movable boundary, such as an elastomeric bladder. One chamber is charged with a gas under pressure and the other chamber is communicated, via an oil port, with the liquid in the hydraulic system.

When the pressure in the gas chamber exceeds pressures in the hydraulic system, the bladder or a valve actuated by the bladder is caused to seal the oil port. When the pressure within the hydraulic line, either by way of a pulse or by way of a steady pressure, exceeds the pressure in the gas chamber, the valve member is unseated from the oil port and hydraulic liquid is caused to flow into the oil chamber to compress the gas therein.

The energy resulting from compression of the gas in the chamber is absorbed in the gaseous medium and when the pressure in the hydraulic line falls below that in the gas chamber, is retransferred by the expanding gases back to the hydraulic fluid, whereby the pressures in the hydraulic system downstream of the accumulator are rendered far more constant than the pressure upstream.

In the absence of a dampener device, the pulses generated may be sufficiently severe to cause damage to other components in the system, rupture pipes, and the like, the problem being compounded by harmonic effects in the system which may magnify the deleterious effects of the generated pulses.

Since frequency and amplitude of pulses generated in each environment will vary from installation to installation, and since variations in the fluids processed, pumps employed and like factors, will, in large measure, present different dampening requirements in each instance, it has heretofore been necessary to provide a relatively wide range of dampener assemblies having different dampening characteristics and, in many instances, experimentally to employ a number of such devices on a trial and error basis in a specific installation to effect efficient dampening.

Further, in a given installation where one or more of the variable factors is changed, i.e. where a different pump is used or the pump speed is modified, a substitute dampening device may be required.

SUMMARY OF THE INVENTION

The present invention may be summarized as directed to a pulse dampener adapted to be adjusted to enable a tuning of the dampener to a wide range of conditions encountered during operation. The tuning may be effected while the dampening operation is being carried out to enable optimizing of the dampening characteristics during use.

More particularly, the apparatus is comprised of a pressure vessel having a resilient bladder disposed therein dividing the same into two chambers, namely, a gas chamber and an oil chamber. The device includes a through-going passage formed in the housing supporting the pressure vessel, said passage having fittings at each end for connection to the pressure lines of a hydraulic system, the passage being communicated to the oil port of the device.

A baffle member is interposed in the passage, the member preferably including on its upstream and downstream surfaces deflector portions angled toward the oil port and a baffle plate having an aperture disposed therein.

In accordance with the present invention, means are provided for shifting the baffle assembly toward and away from the oil port, thereby to vary the blocking and deflecting effects of the baffle plate and deflectors portions on the flow of fluid between the fittings. By adjusting the baffle member during operation and observing the effects of the adjustment on the pulse amplitudes downstream of the accumulator, optimum dampening may be obtained.

It is accordingly an object of the invention to provide an improved pulse dampener device having a novel construction whereby the proportions of fluid directed toward the pressure vessel on the one hand, and permitted to flow directly through the passage on the other hand may be varied infinitely to optimize dampening in any given situation.

A further object of the invention is the provision of a device of the type described which is of an inexpensive and durable construction.

Still a further object of the invention is the provision of a device of the type described including a housing having a through-going bore, a pressure vessel mounted to the housing, the pressure vessel being divided into liquid and gas chambers, the combination including a baffle assembly in the housing which is shiftable toward and away from the oil port into variable intersecting positions of the through passage, thereby to regulate the proportion of fluid permitted to pass freely through the passage as against the proportion of fluid deflected toward the pressure vessel.

To attain these objects and such further objects as may appear herein or be hereinafter pointed out, reference is made to the accompanying drawing, forming a part hereof wherein the FIGURE is a vertical sectional view through a dampener device in accordance with the invention.

Referring now to the drawing, the device in accordance with the invention comprises a pressure vessel 10, generally in the form of a cylindrical member, having hemispherical upper and lower ends 11, 12, respectively. A gas charging port 13 is formed at the upper end 11 and an oil port 14 is formed at the lower end 12 of the vessel.

A gas charging valve assembly 15 is mounted in the gas charging port for enabling the introduction of gas under pressure into the interior of the vessel.

A resilient elastomeric bladder assembly 16 is disposed within the pressure vessel, the bladder assembly dividing the interior of the vessel into an upper chamber 17 in communication with the gas charging port 13 and a lower chamber 18 in communication with the oil port 14.

The partition or bladder 16 may include a metal button or valve member 19 molded or bonded into the material of the bladder for sealing and unsealing the oil port, the valve member, by virtue of its rigidity, preventing extrusion of the bladder through the port.

The device includes a housing 20 which may take the form of a rectangular metal block having a throughgoing bore 21 formed therein, the terminal ends of the bore 21 defining threaded attachment fittings 22, 23 for enabling the housing to be secured to compatibly threaded ends of the pressure lines of a hydraulic system.

The pressure vessel 10 is secured to the housing 20 by an attachment sleeve 24. The sleeve 24, which is generally cylindrical and hollow, includes diametrically opposed flow apertures 25, 26 directed transversely of the longitudinal axis of sleeve 24.

The sleeve 24, at its upper end 28, includes a beveled valve seat 29 shaped to be complementally engaged by the button or valve member 19 carried by the bladder. The sleeve, adjacent the valve seat 29, is provided with a radially extending flange 30 having a downwardly directed retainer shoulder 31. The sleeve is secured in the oil port 14 by a mounting assembly 32 which, illustratively, may be manufactured in accordance with the construction of U.S. Pat. Nos. 3,782,418 and/or 3,439,712.

The mounting assembly 32 may be comprised of a pair of metallic mounting segments 33, 34, each being arcuate and of an angular extent of substantially 180°. The segments 33, 34 are maintained together in an annular configuration by a continuous elastomeric ring 35 whereby the assembly 32 may be folded about the junction line between the arcuate segments 33, 34 and passed into the interior of the pressure vessel 10 through the oil port 14 whereat, upon release of the folded device 32, the same will spring back to reassume an annular configuration.

Arcuate segments 33, 34 include downwardly directed curved edges which closely engage the beveled annular surface 36 surrounding the oil port. The segments include an upwardly facing annular shoulder 37 of lesser diameter than the diameter of the downwardly directed shoulder 31 of the sleeve whereby, when the parts are positioned as shown, the downwardly directed portions of the shoulder 31 of the sleeve bear against the upwardly facing shoulder 37 of the arcuate segments. The inner diameter 38 defined by the arcuate segments 33, 34 of the mounting assembly is sized closely to embrace the outer diameter of the sleeve 24.

In order to effect a fluid-tight seal between the sleeve and the oil port there is provided an upper washer 39, an O-ring 40, and a lower compression washer 41. An annular collar member 42 is disposed between the compression washer 41 and the housing 20.

The collar 42 includes a reduced diameter neck portion 43 which extends upwardly into the annular space defined between the oil port 14 and the outer diameter of the sleeve 24.

The collar 42 includes an enlarged annular base portion 44 which lies within an annular recess 45 formed in the upper surface 46 of the housing. An O-ring retainer channel 47 may be disposed beneath the recess 45 in the housing for the reception of a further O-ring 48.

A seal is effected between the lower end 49 of the sleeve 24 and the housing 20 by a lower O-ring 50 mounted in annular groove 51 formed in the housing.

The external portion of the lower end 49 of the sleeve 24 is threaded as at 52 for the reception of a clamp nut 53.

A baffle assembly 54 is mounted within the lower end 49 of the sleeve. The baffle assembly includes a cylindrical shank portion 55 having an outwardly facing groove 56, within which groove is mounted an O-ring 57. The O-ring 57 is intimately engaged with the internal walls of the sleeve 24 and thus prevents the passage of fluids outwardly through the space defined between the baffle assembly and the sleeve.

The baffle assembly 54 is provided with an axially directed groove or slot 58, which groove or slot straddles a projecting key portion 59 extending inwardly from the sleeve 24. The interengagement of the key 59 and the groove 58 permits axial shifting movement of the baffle assembly relative to the sleeve while preventing relative rotation of the noted parts.

The baffle assembly 54 includes inclined deflector portions 60, 61 which may be arcuate in transverse section, the deflector portions 60, 61 being inclined upwardly or toward the oil port 14. The baffle assembly includes, in addition, a baffle plate 62 including a transverse opening 63 formed therethrough, the opening 63 having its axis parallel to the flow passage 21. Means are provided for bodily shifting the baffle assembly 54 upwardly, i.e. in the direction of the axis of the pressure vessel 10. Such means comprise a plug 64 having a drive socket 65, such as an Allen wrench socket or screw driver slot on its outer end portion 66 for rotating the plug.

The external surface of the plug 64 is threaded as at 67, the threads 67 mating with complemental interior threads 68 formed within the sleeve 24.

Means are provided for coupling the plug 64 to the baffle assembly 54 in such manner that axial movement of the plug relative to the sleeve is communicated to the baffle assembly while allowing relative rotation between the noted parts.

Illustratively, to this end, the plug 64 includes an upwardly directed cylindrical neck 69 having a circumferential, outwardly facing annular groove 70 formed therein. The neck 69 is received within a blind bore 71 formed on the outer end 72 of the baffle assembly 54.

The blind bore 71 is provided with an inwardly facing annular groove 73 which, in the mounted position of the plug, registers with the outwardly facing groove 70 in the neck 69. A split snap washer 74 is adapted to span the annular grooves 70 and 73, thereby coupling the plug and baffle assembly for axial movement while permitting relative rotation of the parts.

Mounting of the plug within the baffle assembly is effected by pressing the snap washer radially to reduce its circumference to a size at which it is permitted to pass into the interior of the blind bore 71. When the groove 70 in the neck carrying the snap washer is shifted axially into registry with the inwardly facing groove 73 formed in the bore 71, the washer will snap outwardly to its uncompressed condition whereat it will, as noted, span the grooves 70 and 73, linking the plug and baffle assembly.

The operation of the device will be evident from the preceding description.

In use, the fittings 22, 23 are connected to the conduits of a hydraulic system carrying liquid under pulsing pressures. Gas is charged into the chamber 17 through the gas charging valve assembly 15. Where the gas pressure in chamber 17 exceeds the hydraulic pressure in the line 21, the valve 19 will be caused to be pressed against the valve seat 29. When pressures, including pulse pressures of a magnitude greater than the pressure in the gas chamber 17, are present in the passage 21, hydraulic fluid will pass upwardly and unseat the valve 19, allowing fluid to enter the oil chamber 18.

The dampening characteristics of the device, in large measure, will depend upon the position of the baffle member 54 relative to the flow path 21. This position, as noted, may be varied by threading the plug 64 axially inwardly or outwardly within the sleeve 24.

It will be appreciated that when the baffle member 54 is urged axially toward the oil port, the through passage 63 in the baffle plate 62 will be displaced progressively from its aligned position with the axis of flow passage 21 and the inclined surfaces 61 will be progressively introduced into the said flow path. With continued inward shifting movement of the baffle assembly 54, the effective cross-section of the flow path will likewise be progressively reduced.

As a general guide line, where the dampener device is employed in a hydraulic system having high amplitude but low frequency pulses, such pulses are most effectively dampened with minimum efficiency loss in the system when the baffle member is shifted downwardly within the housing such that the passage 63 is aligned generally with the axis of the through passage 21 of the housing.

Where higher frequency pulses are encountered, particularly where the system does not have a high volume flow characteristic, it is generally preferable to shift the baffle assembly toward the oil port such as at least partially to offset the aperture 63 from the passage 21 and advance the deflector portion 61 into registry with the flow passage.

Since small variations of positioning of the baffle member within the sleeve can have a profound effect on the dampening efficiency of the device, it is desirable that adjustment of the baffle be effected during actual operation of the system, a function which can be readily carried out with the device of the instant invention.

While the system is operating in the normal fashion, it is merely necessary to observe a pressure gauge downstream of the dampener while adjusting the position of the baffle member to arrive at that adjusted position where the pulses are of least amplitude. Optionally but preferably, for purposes of safety, means may be provided whereby the plug member may not be unthreaded completely from connection with the sleeve 24 since otherwise the plug and baffle may be propelled outwardly with great force, with consequent possible injury to the operator.

It will be obvious to those skilled in the art who are familiarized with the instant disclosure that numerous variations thereof by way of modified structural details may be made without departing from the spirit of the invention. Accordingly, the same is to be broadly construed within the scope of the appended claims.

Having thus described the invention and illustrated its use, what is claimed as new and is desired to be secured by Letters Patent is:

1. An adjustable pulse dampener device comprising, in combination, a pressure vessel having a gas charging port at one end and an oil port in the other end, a housing mounted on said other end of said vessel and including walls forming a through-going flow passage, fitting means at the terminal ends of said passage for connection to a conduit of a hydraulic circuit, a gas charging valve mounted in said gas port, a resilient expansible partition mounted in said vessel and dividing the same into two chambers in communication, respectively, with said oil port and said gas port, a hollow cylindrical sleeve member mounted in said housing and extending axially into said pressure vessel through said oil port, the upper end of said sleeve member defining a valve seat positioned to coact with said partition to open and close said oil port in accordance with the pressures within said chambers, said sleeve including a spaced pair of apertures extending transversely therethrough, said apertures being in coaxial alignment with each other and with said flow path, a baffle member mounted in said sleeve, said baffle member including portions disposed in said flow passage between said apertures in partial blocking relation of said path, and adjustment means interposed between said sleeve and said baffle member for shifting said baffle member axially of said sleeve into variable blocking positions of said flow path.

2. An adjustable pulse dampener in accordance with claim 1 wherein said baffle member is disposed normal to said flow path, said baffle member and sleeve including complemental guide means aligned axially of said sleeve for locking said baffle against rotation within said sleeve.

3. An adjustable pulse dampener in accordance with claim 2 wherein said baffle includes a through-going bore aligned with said flow path.

4. An adjustable dampener in accordance with claim 3 wherein said adjustment means comprises a threaded bore on said sleeve in alignment with the sleeve axis, a plug member having threads complementally engaging the threads of said threaded bore, and axially inextensible and relatively rotatable connector means linking said plug and said baffle member.

5. An adjustable pulse dampener in accordance with claim 1 wherein said baffle member includes a substantially flat plate portion disposed normal to the axis of said flow passage, said baffle member including on each of the upstream and downstream surfaces thereof, at positions spaced further from said oil port than said plate portion, a deflector portion inclined toward said oil port, said deflector portions being variably projected into said flow path in accordance with the adjusted position of said adjustment means.

6. An adjustable pulse dampener in accordance with claim 5 wherein said flat plate portion includes a through-going by-pass aperture having its axis aligned in parallel relation to the axis of said flow path.

7. An adjustable pulse dampener in accordance with claim 6 wherein said adjustment means is shiftable through a range of movement sufficient to shift said aperture of said baffle to a position above and clear of said flow path.

* * * * *